L. T. HARPER.
SUBMERGED PUMP.

No. 174,814. Patented March 14, 1876.

Witnesses:
Franck L. Durand
Philip McNickle

Inventor
Leverett T. Harper
by L. Deane
Attorney.

N. PETERS, PHOTO-LITHOGRAPHER, WASHINGTON, D. C.

UNITED STATES PATENT OFFICE.

LEVERETT T. HARPER, OF OWATONNA, MINNESOTA.

IMPROVEMENT IN SUBMERGED PUMPS.

Specification forming part of Letters Patent No. 174,814, dated March 14, 1876; application filed November 29, 1875.

*To all whom it may concern:*

Be it known that I, LEVERETT T. HARPER, of Owatonna, in the county of Steele and State of Minnesota, have invented certain new and useful Improvements in Submerged Pump, of which the following is a specification:

The nature of my invention consists in the construction and arrangement of a submerged force-pump, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
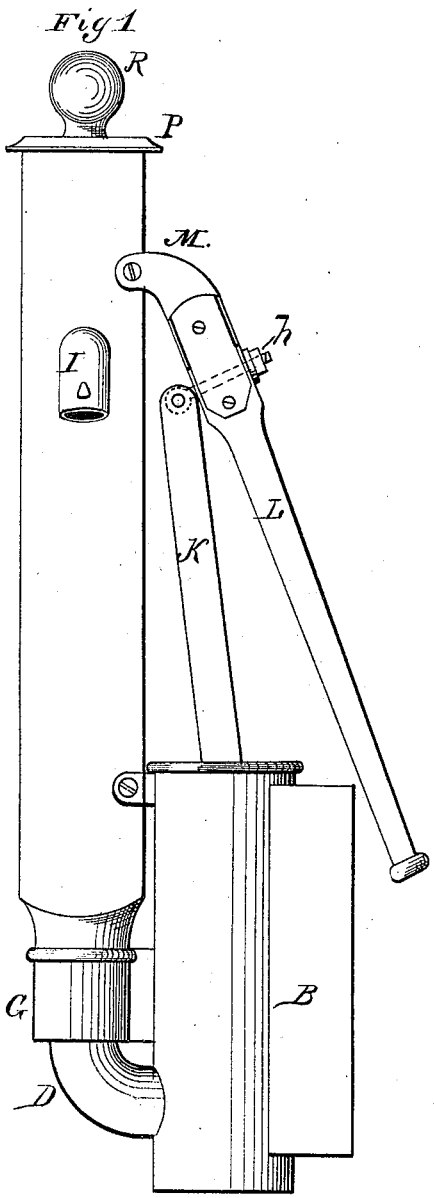
Figure 2:
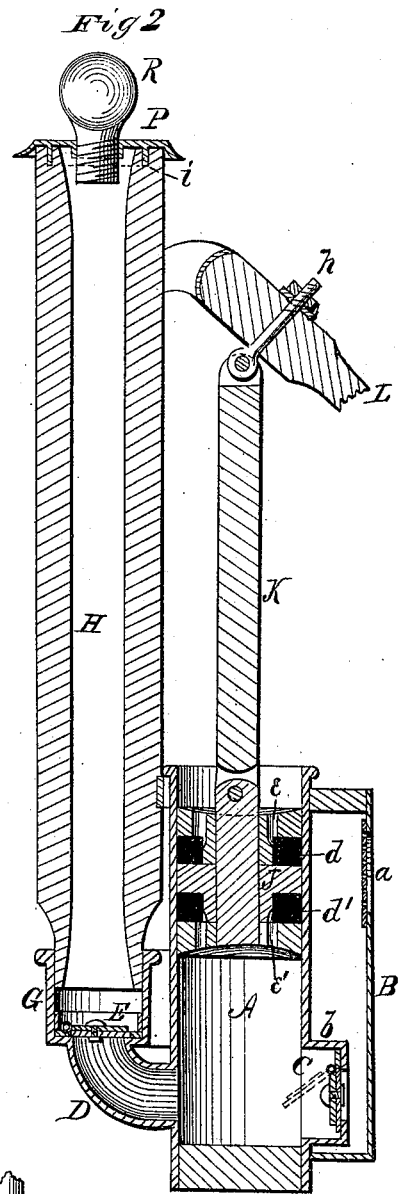
Figure 3:
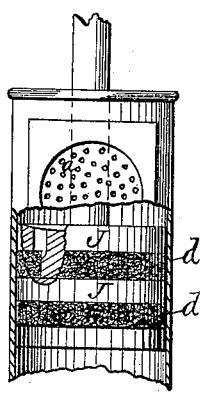
Figure 4:
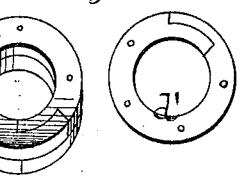

Figure 1 is a side elevation of my force-pump. Fig. 2 is a longitudinal section of the same. Fig. 3 is a detail, showing the screen as now applied, and the piston. Fig. 4 shows the packing-rings used in the piston.

A represents the pump cylinder closed at its lower end and open at the top. On one side of the cylinder A, and extending nearly the entire length, is a chamber, B, which is entirely closed, except near the top, where a strainer, $a$, is inserted, as shown in Fig. 2. The pump is to rest on the bottom of the well, and the water passes through the strainer $a$ into the chamber B. Within this chamber, near the lower end of the cylinder, is a collar, $b$, projecting from the cylinder and surrounding an aperture therein. In this collar or tubular projection is hinged a valve, C, which opens inward and upward to admit the water from the chamber B into the cylinder. On the opposite side of the cylinder, at or near the bottom, projects an elbow, D, the top of which forms a horizontal valve-seat for the check-valve E, said valve opening upward. At the upper end of the elbow D, above the valve, is formed a socket for the insertion of the pump-stock or outlet-pipe H, which is closed at its upper end, and on one side provided with a spout, I. By admitting water into the side of the cylinder it can sit firmly on the bottom of the well, thus allowing the piston or plunger to be as nearly submerged as the water in the well will allow. The valve C being hung at the top prevents it getting clogged or in any way getting out of order. The elbow D forms a chamber below the valve E, which, together with the level valve-seat, prevents anything from lodging under the valve which would cause it to leak. It also admits of the valve being got at more readily. J represents the piston or plunger formed with two circumferential grooves for the reception of the two packing-rings $d\ d'$, which are expanded by the water passing through passages $e\ e'$ into the grooves behind the packing-rings. On the upstroke of the piston the water expands the upper ring $d$, and on the downstroke it is the lower ring $d'$ which is expanded. The advantages of having a suction-packing as well as a force-packing are that, oftentimes, the water in the wells where this pump is used gets very low. In this event the suction-packing performs a very valuable function in filling the pump. The body J of the piston may be made of one or more pieces, as desired, and is connected by a pivoted rod, K, with the handle L, which is pivoted to the pump-stock H. The connection between the handle L and rod K is made by a pivot-bolt, $h$, as shown, which allows of the handle falling down when the pump is not in use. The upper end of the pump-stock H is provided with a cap, P, having a rim, $i$, to drive into the stock, and in the center of the cap is a screw, R, to give the pump vent or make it air and water tight, as may be desired. The handle L is connected to the pump-stock by curved irons M, as shown, whereby the handle may be arranged so as to govern the length of the stroke, and drop down when not in use. The packing-rings are joined together, as shown in Fig. 4, the joint being made in the form of a Z, so as to make a continuous joint either way. The cylinder may be made either wholly or in part of metal or wood, as may be deemed most desirable; and the strainer in the chamber B may be inserted at such point as is necessary or desirable, in order to admit the water according to the depth of the water in the well.

Having thus fully described my invention, what I claim as new, and desire to secure by Letters Patent, is—

1. The combination of the cylinder A, chamber B with strainer $a$, and the valve C opening inward and upward into the cylinder, substantially as and for the purposes herein set forth.

2. The cover P, provided with the rim or flange $i$, and central vent-screw R, as and for purposes herein set forth.

3. The piston or plunger J, provided with two circumferential grooves for the packing-rings $d$ $d'$, and the water-passages $e$ and $e'$, combined with the pump-cylinder A, chamber B, and inlet-valve C, substantially as and for the purposes herein set forth.

4. In a pump the combination of the plunger-rod K, eyebolt $h$, handle L, curved irons M, and the pump-stock, all substantially as and for the purposes herein set forth.

5. In combination with pump-cylinder A, having inlet-valve C, as described, and provided with piston J, the elbow D, connecting at the bottom with the lower end of the pump-cylinder, and having at its upper end a level valve-seat for check-valve E, and supporting the pump-stock H, all substantially as and for the purposes set forth.

In testimony that I claim the foregoing as my own, I affix my signature in presence of two witnesses.

LEVERETT T. HARPER.

Witnesses:
  A. N. STOUGHTON,
  L. S. PADGHAM.